United States Patent
Willert et al.

(10) Patent No.: US 12,292,910 B2
(45) Date of Patent: May 6, 2025

(54) TEXT CLASSIFICATION COMMAND LINE INTERFACE TOOL AND RELATED METHOD

(71) Applicant: Klaviyo, Inc., Boston, MA (US)

(72) Inventors: Zachary Lloyd Roth Willert, Newton, MA (US); David James Lustig, Boston, MA (US)

(73) Assignee: Klaviyo, Inc., Boston, MA (US)

(*) Notice: Subject to any disclaimer, the term of this patent is extended or adjusted under 35 U.S.C. 154(b) by 0 days.

(21) Appl. No.: 18/441,797

(22) Filed: Feb. 14, 2024

(65) Prior Publication Data
US 2025/0103634 A1    Mar. 27, 2025

Related U.S. Application Data

(60) Provisional application No. 63/584,980, filed on Sep. 25, 2023.

(51) Int. Cl.
| | |
|---|---|
| *G06F 16/335* | (2019.01) |
| *G06F 9/451* | (2018.01) |
| *G06F 16/35* | (2025.01) |
| *G06F 16/383* | (2019.01) |

(52) U.S. Cl.
CPC ............ *G06F 16/335* (2019.01); *G06F 9/453* (2018.02); *G06F 16/35* (2019.01); *G06F 16/383* (2019.01)

(58) Field of Classification Search
CPC ...... G06F 16/335; G06F 16/35; G06F 16/383; G06F 9/453
See application file for complete search history.

(56) References Cited

U.S. PATENT DOCUMENTS

| | | | |
|---|---|---|---|
| 11,734,937 B1 | 8/2023 | Pushkin et al. | |
| 11,983,244 B1 | 5/2024 | Zhdanov et al. | |
| 12,020,265 B1* | 6/2024 | Mao | G06Q 30/0243 |
| 12,032,687 B2 | 7/2024 | Stokes, III et al. | |
| 12,056,169 B1 | 8/2024 | Mishra et al. | |
| 2019/0129958 A1* | 5/2019 | Liao | G06F 16/3326 |
| 2020/0104628 A1 | 4/2020 | Rajamohan et al. | |
| 2020/0285683 A1 | 9/2020 | David | |
| 2021/0157872 A1 | 5/2021 | David | |
| 2022/0058440 A1* | 2/2022 | Feng | G06F 18/2178 |

(Continued)

*Primary Examiner* — Dangelino N Gortayo
(74) *Attorney, Agent, or Firm* — Batt IP A Law Corporation

(57) ABSTRACT

A text classification command line interface tool assists a user label a dataset. The command line interface tool comprises a plurality of top-level modules programmed and operable to assist a user to obtain the dataset from a file location, semi-automatically search and label select datapoints of the dataset, train a first label-assist model, compute confidence scores for each of the datapoints of the dataset, and review metrics. The command line interface tool is operable to assist a user to retrain the first label-assist model via reinforcement learning until accuracy is sufficient. The CLI tool can save and export the pre-processed labeled dataset. In embodiments, a production classifier is trained using the preprocessed dataset and operable to classify new datapoints in real time. Examples of datapoints to classify include without limitation entity websites. Examples of categories include, without limitation, SHAFT and cannabis-related categories. Related computer-implemented methods are also described.

13 Claims, 13 Drawing Sheets

(56) References Cited

U.S. PATENT DOCUMENTS

| | | | |
|---|---|---|---|
| 2022/0207163 A1* | 6/2022 | Gentleman | G06F 21/62 |
| 2022/0414166 A1 | 12/2022 | Juravicius et al. | |
| 2023/0244987 A1* | 8/2023 | Truong | G06N 20/00 706/11 |
| 2023/0267175 A1* | 8/2023 | Jain | G06F 18/22 706/15 |
| 2023/0297886 A1 | 9/2023 | Glaser | |

* cited by examiner

TEXT CLASSIFICATION COMMAND LINE INTERFACE TOOL AND RELATED METHOD

TECHNICAL FIELD

This generally relates to data science, and more particularly, to tools for automatically building large datasets.

BACKGROUND

Data science classification modeling requires large labeled datasets to train the classification model. To label a dataset of datapoints, the label(s) are identified for each datapoint.

The standard method for labeling datapoints is to view a spreadsheet and perform, line by line, manual classification; i.e., to click through a spreadsheet, read the contents of each row, and add a label to each row based on its contents. Although manually clicking through a spreadsheet, line by line, may be adequate for small labeling tasks, such a technique is relatively clunky and prone to errors, and extremely (if not prohibitively) burdensome for labeling hundreds or thousands of classifications.

For large worksheets, it is cognitively difficult (both from an accuracy and fatigue perspective) to focus on one cell at a time and exclude adjacent cells.

Worksheets can also be pretty slow for large chunks of text if one needs to search or process in any way—slowness arises in part due to the need to update a whole UI.

Search and filter queries can also be prone to typos in worksheets. Because of the freedom in a worksheet, one can inadvertently include a typo in the search query, and thus showing results unrepresentative of the true search and query. Indeed, use of worksheets to label data suffer many problems.

Accordingly, a method and system that addresses the above-mentioned challenges is desired.

SUMMARY OF THE INVENTION

In embodiments of the invention, a computer user interface tool to assist labeling an initial dataset of unlabeled datapoints comprises: a user input device for accepting user commands; a display; and a processor framework programmed and operable to: upon receiving a user search command, generate a filtered set of unlabeled datapoints by searching and filtering the initial data set of unlabeled datapoints based on a keyword associated with each category; generate a verified set of labeled datapoints based on a user manually reviewing and labeling the filtered set of unlabeled datapoints; upon receiving a user train command, train, during a first phase, a first data-labeling model based on the verified set of labeled datapoints; and upon receiving a user compute command, compute a category and confidence score for each datapoint of the initial dataset of datapoints based on the first data-labeling model.

In embodiments of the invention, the processor framework is programmed and operable to assist a user to: update the verified set of labeled datapoints by reviewing and manually labeling low-confidence datapoints having a confidence score below a minimum value; update the verified set of labeled datapoints by reviewing and manually labeling high-confidence datapoints having a confidence score above a threshold value; and train, during a second phase, the first data-labeling model based on the updated verified set of labeled datapoints; and recompute a category and confidence score for each datapoint of the initial dataset of datapoints based on the first data-labeling model.

In embodiments of the invention, the processor framework is programmed and operable to assist a user to: update the verified set of labeled datapoints by reviewing and manually labeling low-confidence datapoints having a confidence score below a minimum value; update the verified set of labeled datapoints by reviewing and manually labeling high-confidence datapoints having a confidence score above a threshold value; train, during a third phase, the first data-labeling model based on the updated verified set of labeled datapoints; and recompute a category and confidence score for each datapoint of the initial dataset of datapoints based on the first data-labeling model.

In embodiments of the invention, the processor framework is programmed and operable to assist a user to: repeat the training, computing, and labeling steps until label accuracy between the predicted labeled datapoints and a validation data set is above a target value.

In embodiments of the invention, the processor framework is programmed and operable to assist a user to save to a database storage the labeled datapoints as the preprocessed dataset of labeled datapoints.

In embodiments of the invention, the processor framework is programmed and operable to assist a user to export the preprocessed dataset of labeled datapoints with confidence scores.

In embodiments of the invention, the processor framework is programmed and operable to assist a user to compute the number of the number of datapoints for each label.

In embodiments of the invention, the processor framework is programmed and operable to assist a user to identify datapoints in which the predicted label does not match the verified label.

In embodiments of the invention, the processor framework is programmed and operable to assist a user to train a second label-assist model, and wherein the preprocessed dataset of labeled datapoints is based on the first and second label-assist models.

In embodiments of the invention, the tool further comprises a label dictionary comprising a plurality of labels.

In embodiments of the invention, the labels comprise SHAFT and cannabis-related labels.

In embodiments of the invention, the processor framework is implemented in a personal computer, optionally laptop.

In embodiments of the invention, a data label-assist tool enables rapid manual labeling of human-identifiable text data.

In embodiments of the invention, a computer user interface, optionally a command line interface, assists users to cycle through top-level options and their sub-modules in order to label efficiently. Top-level functions include searching, labeling, model training, review, metrics and saving.

In embodiments of the invention, a search module is operable to assist a user to search through any of the columns of a data file to quickly label items that are expected to belong to a particular class (i.e. searching "cannabis" to label companies that may be selling cannabis). The model is operable to provide all unlabeled observations that match the search criteria. In embodiments, the data file is a csv.

In embodiments of the invention, an untuned natural language classification model is trained based on the items labeled by the user.

In embodiments of the invention, a labeling module is operable to predict categories for each row based on a trained natural language classification model.

In embodiments of the invention, the classification model is operable to compute confidence scores for its predictions of the unlabeled observations.

In embodiments of the invention, retraining is performed by reinforcement learning. In preferred embodiments of the invention, the model selects or identifies the rows having the lowest confidence scores for manual review and labeling. The datapoints having the lowest confidence score tend to have high probative or model training value because such datapoints are edge cases.

In embodiments of the invention, a review module is operable to assist a user to search and review datapoints such as mislabeled datapoints where the predicted category is different than the actual category.

In embodiments of the invention, a metrics module is operable to compute various performance metrics such as, e.g., accuracy and label counts. In embodiments, categories having low accuracy and/or low counts are identified. The user is prompted to seek additional examples of verified labeled datapoints corresponding to the low accuracy and low count categories.

In embodiments of the invention, a saving module or function is operable to save upon user instruction the updated dataset to a data storage including confidence scores and labels. In embodiments of the invention, the updated dataset may be exported.

In embodiments of the invention, a computer-implemented method includes use of a production classification model trained with a dataset pre-processed by the data label-assist tool.

In embodiments of the invention, a method for classifying a new datapoint into a category comprises: detecting entity behaviors from input computing devices; generating, on a cloud-based server, unlabeled datapoints based on the entity behaviors; aggregating, on the cloud server, the unlabeled datapoints from the generating step into an initial dataset of unlabeled datapoints; providing a data labeling-assist module programmed and operable to interface with a user to transform the initial dataset of unlabeled datapoints into a preprocessed dataset of labeled datapoints; training a classifier production model based on the pre-processed set of labeled datapoints; receiving the new datapoint; computing a confidence score for the new datapoint based on the classifier production model; and assigning a label to the new datapoint based on the confidence score.

In embodiments, the detecting behavior comprises detecting entity onboarding or registering, sub-entity click-through rates, purchase history, and email open rates.

In embodiments, the generating step comprises scraping a website if behavior was an entity registration, or storing a metric related to a sub-entity response or purchase.

In embodiments, the aggregating comprises assembling the datapoints into a csv file.

In another embodiment of the invention, a computer-implemented method for assisting a user with labeling an initial dataset of unlabeled datapoints comprises the steps of: upon a first computer command, retrieving the initial dataset; upon a second computer command, filtering the plurality of datapoints of the initial dataset to a first set of unlabeled datapoints based on a first keyword associated with a first label; assigning the first label to at least a portion of the unlabeled datapoints of the first set of unlabeled datapoints after verifying the first label is correct for the unlabeled datapoint being reviewed, thereby generating a first set of verified labeled datapoints; upon a third computer command, training, during a first phase, a first data-labeling model based on the first set of verified labeled datapoints; and upon a fourth computer command, computing a confidence score for each of the datapoints of the initial data set based on the first data-labeling model.

In embodiments, the method further comprises identifying a second set of unlabeled datapoints having confidence scores below a minimum value; assigning the first label to at least a portion of the unlabeled datapoints of the second set of unlabeled datapoints after verifying the first label is correct for the unlabeled datapoint being reviewed, thereby generating a second set of verified labeled datapoints; and retraining the first-label model based on all labeled datapoints including all predicted and verified labeled datapoints.

In another embodiment of the invention, a computer system is programmed and operable to classify whether an entity is involved in selling or marketing prohibited goods and services related to sex, hate, alcohol, firearms, tobacco, and cannabis.

In embodiments of the invention, the system is programmed and operable to classify the entity using a trained machine learning model based on the content automatically gathered from the entity's website.

In embodiments of the invention, the trained model is a decision tree-based model, and in preferred embodiments, a gradient boosting model or extreme gradient boosting model.

In embodiments of the invention, the system is programmed and operable to compute a score for a plurality of categories including a score for each prohibited category for the entity.

In embodiments of the invention, the text is scraped from the website and excludes the non-text information in the HTML code.

In embodiments of the invention, the text is scraped using a website scraper, and in some embodiments, the text is scraped using the Python or TypeScript scraper.

In embodiments of the invention, the text is parsed, and in some embodiments, the text is parsed using the Beautiful Soup Parser.

In embodiments of the invention, the text is vectorized. In some embodiments, the text is vectorized using word count methods such as term frequency-inverse document frequency (TF-IDF), or embedding methods such as bidirectional encoder representations from transformers (BERT).

In embodiments of the invention, the vectorized text is sent to the trained model to compute a score for each of the plurality of categories.

In embodiments of the invention, each score is a probability, optionally between 0-1 or 0-100 and in some embodiments, the sum of the scores for all the categories equals 1 or 100 respectively, for each true label.

In embodiments of the invention, the system is programmed and operable to classify the entity according to the category having the highest score.

In embodiments of the invention, the system is programmed and operable to classify the entity as a shaft entity, a non-shaft entity, an unknown entity, or empty.

In embodiments, an entity account is classified as 'empty' if the website is not live (e.g., empty of products/relevant content).

In embodiments of the invention, the system is programmed and operable to store the entity, category, and score.

In another embodiment of the invention, a computer-implemented method of training a production model to classify prohibited entities comprises: gathering text from a plurality of different entity websites; preparing a first data set for a first stage of training by labeling a portion of the websites with a category from a group of prohibited categories; providing at least one candidate label-assist model; training the at least one candidate label-assist model during the first stage using the first data set to predict a category and a confidence score for each of the plurality of websites; creating a second data set for a second stage of training by identifying and relabeling all the websites having high confidence scores greater than a threshold value (e.g., labeling the cannabis website or another category if the confidence score is greater than 80%) with the predicted category; and training the at least one candidate label-assist model in a second stage using the second data set.

In embodiments of the invention, the computer-implemented method further comprises saving the second data set.

In embodiments of the invention, the at least one candidate label-assist model comprises a plurality of candidate label-assist models, wherein the plurality of candidate label-assist models comprises different types of natural language classification models.

In embodiments of the invention, the computer-implemented method further comprises selecting a production model from the plurality of candidate label-assist models based on the candidate label-assist model predicting categories having the highest accuracy.

In embodiments of the invention, the computer-implemented method further comprises comparing the predicted categories computed by the plurality of candidate label-assist models for matching.

In embodiments of the invention, the computer-implemented method further comprises creating a third data set by labeling the websites with the predicted categories if the predicted categories computed by each of the plurality of candidate label-assist models match, and training the at least one candidate label-assist model during a third stage with the third training set.

In embodiments of the invention, the computer-implemented method further comprises identifying disputed-category websites where the predicted categories computed by each of the plurality of candidate label-assist models do not match.

In embodiments of the invention, the computer-implemented method further comprises creating a fourth data set by relabeling the disputed websites, and training the at least one candidate label-assist model during a fourth stage with the fourth training set.

In embodiments of the invention, the computer-implemented method further comprises identifying at least one low count category, and creating a fifth data set by labeling or relabeling the entities to increase the number of entities in the at least one low count category, and training the at least one label-assist model during a fifth stage with the fifth data set.

In embodiments of the invention, the low count category is defined as a category made up of less than 10% of the labeled entities, or where no further datapoints can be found using text searching or model-assisted techniques.

In embodiments of the invention, the computer-implemented method further comprises identifying edge datapoints having computed confidence scores below 50%, and creating a sixth data set for sixth stage of training by relabeling the edge datapoints, and training the at least one label-assist model during a sixth stage with the sixth data set.

In embodiments of the invention, the trained production model is decision tree based.

In embodiments of the invention, the trained production model is gradient boosting, and in some embodiments, extreme gradient boosting model.

In embodiments of the invention, the computer-implemented method further comprises fetching and parsing the text from the websites, and in some embodiments the parsing is performed by Beautiful Soup.

In embodiments of the invention, the computer-implemented method further comprises vectorizing the parsed text, and in some embodiments vectorizing is performed by TF-IDF.

In embodiments of the invention, the system and computer implemented method predict the scores of the categories of the entity's website without use of the text from the entity's email or SMS, and optionally, the category is predicted based solely on the text of the entity's website.

A meaningful advantage of embodiments of the present invention is that the classifying process is computer implemented and automatic—the system and method do not request (or require) additional information from the entity in order to evaluate its website. In contrast, relying on the entity to send SMS or an email for categorizing the entity can be thwarted if the entity is slow to respond, or worse, does not respond at all.

Another advantage of embodiments of the invention is the speed and convenient searching for observations meeting specific criteria.

Another advantage of embodiments of the invention is the flexibility in inputting a wide range of simple language classification models.

Another advantage of embodiments of the invention is the case of use for non-technical users to build and save simple language classification models.

Another advantage of embodiments of the invention is training models via reinforcement learning where the rows or datapoints having the highest training value are automatically identified for the user.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which.

DETAILED DESCRIPTION

Figure 1:
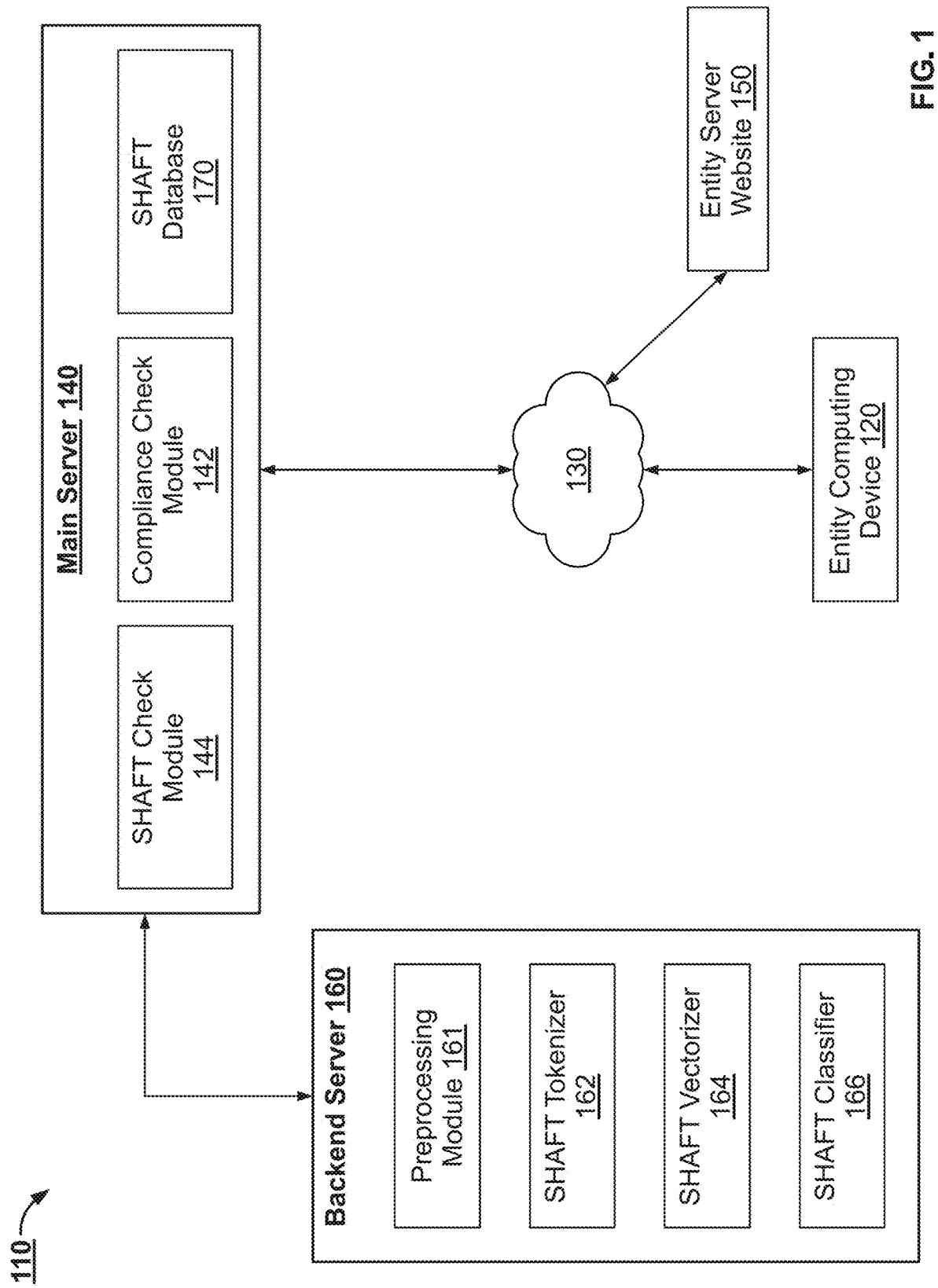
FIG. 1 shows a schematic diagram of a SHAFT classifying system, according to one or more embodiments of the present invention.

Before the present invention is described in greater detail, it is to be understood that this invention is not limited to particular embodiments described, and as such can, of course, vary. It is also to be understood that the terminology used herein is for the purpose of describing particular embodiments only, and is not intended to be limiting, since the scope of the present invention will be limited only by the appended claims. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described. It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein are various methods and systems for efficiently pre-processing large unlabeled datasets of text, training a production-level text classifying model based on a pre-processed comprehensive labeled dataset, and classifying a datapoint such as an entity based on website text gathered from the entity.

FIG. 1 illustrates a high-level schematic diagram of a SHAFT classifying system 110 for classifying an entity (e.g., a business, organization, association, institution, etc.) based on its website, according to embodiments of the present invention.

The system shown in FIG. 1 includes a main server 140 comprising a compliance check module 142. The compliance check module 142 is programmed and operable to communicate with an entity computing device 120 (e.g., a desktop or workstation located at the entity's place of business) via the internet 130. When an entity requests to sign up for a service via their computing device 120, the compliance check module obtains information from the entity including its name, date/time, and website address. Optionally, the compliance check module may request additional information including category of business, pending licenses, and principal place of operation.

The compliance check module 142 then automatically scrapes the entity website 150 for further processing, described herein.

The main server 140 also shows SHAFT check module 144. SHAFT check module 144 is programmed and operable to communicate with backend server 160. In embodiments and as described further herein, the main server 140 can scrape the website and send the text of the website to the backend server 160 for processing and classification.

Backend server 160 is shown including a tokenizer 162, vectorizer 164, and classifier 166. As described herein, tokenizer 162 is programmed and operable to tokenize the text received from the SHAFT check module 144.

Optionally, the backend server comprises a preprocessing module 161 that is operable to preprocess the text from the main server by, for example, omitting/stopping certain words, stemming words, and/or changing the case of the letters (e.g., changing all uppercase letters to lowercase letters).

The vectorizer 164 transforms the tokenized text into a vector or numeric format.

The classifier 166 computes a score (e.g., a confidence score) for each category for the entity based on the vectorized text.

The entity is then categorized according to the SHAFT category having the highest score. The backend server sends the classification and score to the main server and the main server records the entity, class, and an associated score onto the SHAFT database 170. The entire process can be performed for an entity in seconds. New entity classification is continuously added to the SHAFT database 170, serving to identify which entities to prohibit from TFN and SMS services.

Figure 2:
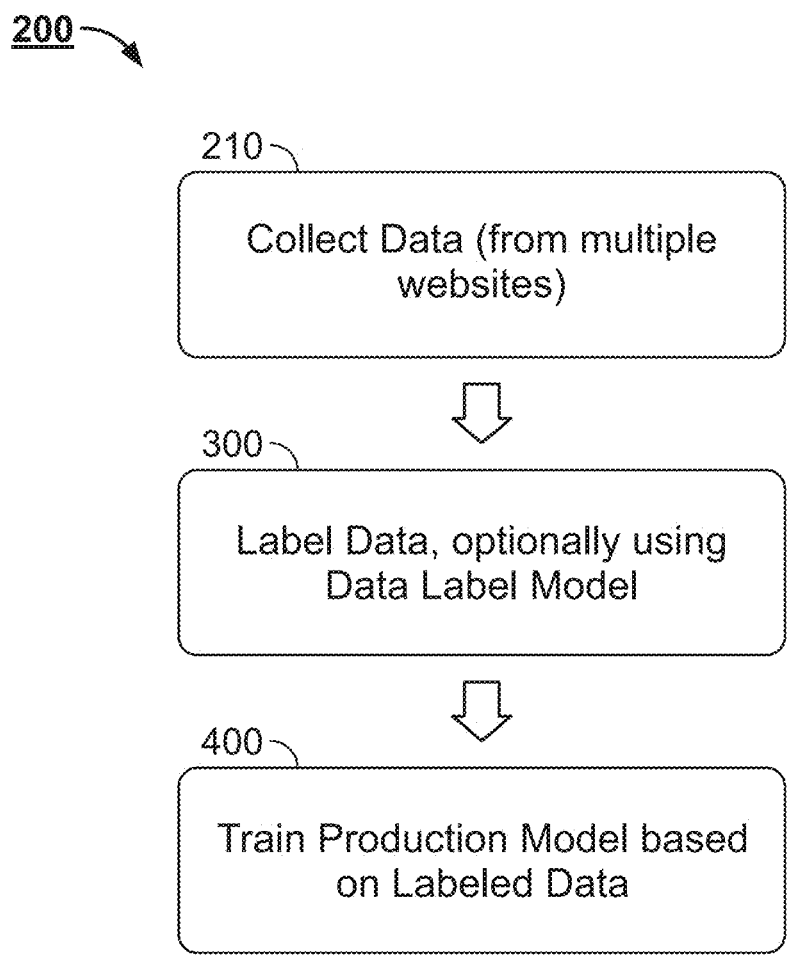
FIG. 2 is a flow chart of a training process, according to one or more embodiments of the present invention.

FIG. 2 is a flow chart of a SHAFT classifier training process, according to one or more embodiments of the present invention.

Step 210 states to collect data for training. As described further herein, data is collected from multiple websites.

Step 300 states to label the data. As described further herein, the data is labeled manually or more preferably automatically through multiple stages. Each website is labeled by category based on its website text.

Step 400 states to train the production model based on the labeled data. As desired herein, the production model is trained, tuned and optimized using the comprehensive labeled data set prepared via step 300.

Data Collecting

Figure 3:
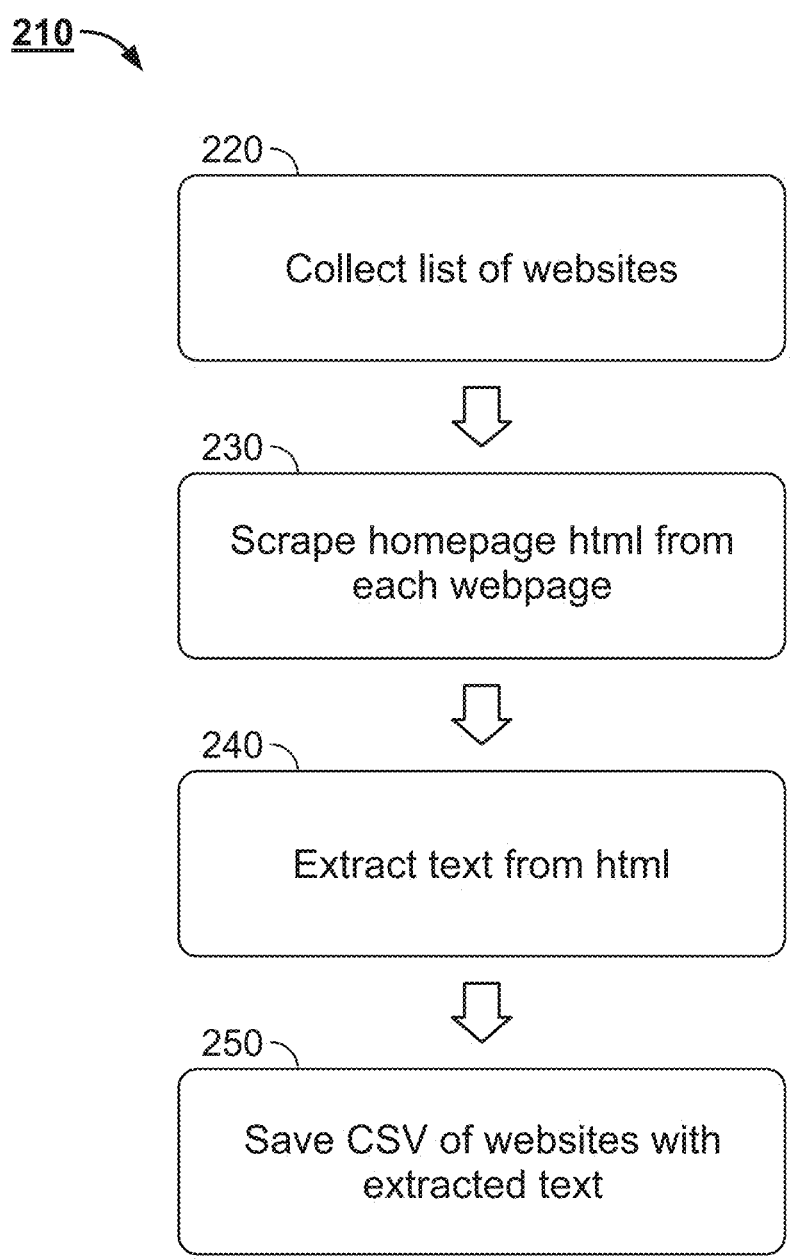
FIG. 3 is a flow chart of a data gathering process, according to one or more embodiments of the present invention.

With reference to FIG. 3, the step of data collecting 210 is further described in accordance with an embodiment of the invention. Particularly, FIG. 3 shows data collecting being commenced by collecting a list of websites from a desired population, e.g., customer or businesses of one or more segments (Step 220). In embodiments, text is collected from greater than 5,000, preferably greater than 7,500, and even more preferably greater than 10,000 websites.

Next, each website is scraped (Step 230). Website scraping may be performed by various tools including, e.g., the Python scraper or TypeScript. In embodiments, the homepage or landing page is scraped, however, in other embodiments, multiple pages of the website are scraped.

Next, the text is extracted from the html elements (Step 240).

A file, such as, for example, a CSV file of the websites with the extracted text is then saved (Step 250).

Data Labeling

Figure 4:
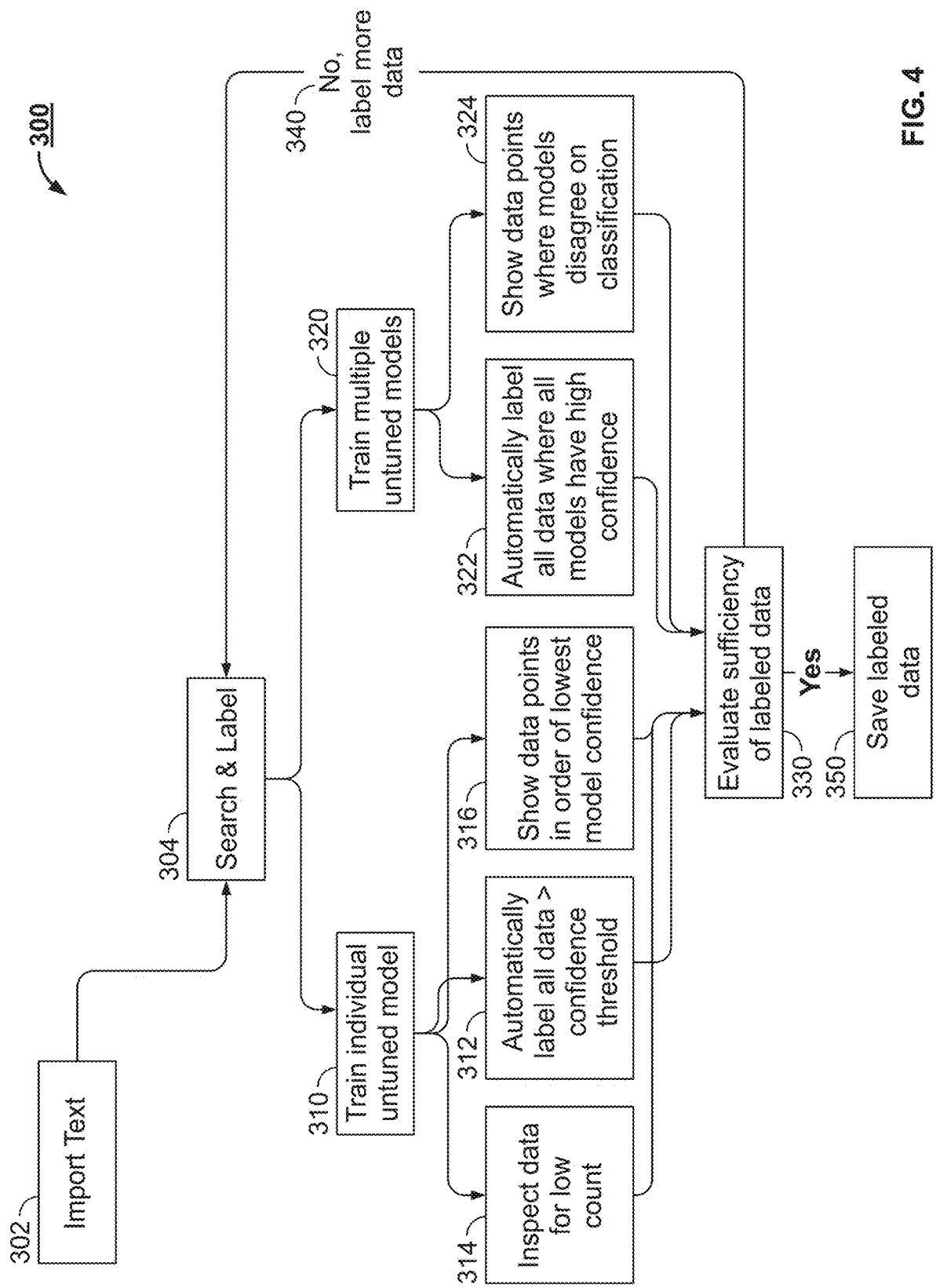
FIG. 4 is a flow chart of a data labeling process, according to one or more embodiments of the present invention.

With reference to FIG. 4, the step of data labeling 300 is described in accordance with an embodiment of the invention. FIG. 4 shows data labeling 300 being commenced by importing the text (Step 302). As described herein, this text data may be in the form of a CSV file where each row comprises the entity name, website, and extracted text from the website.

Step 304 states to search for keywords and label individual datapoints. Each website is labeled based on finding the keywords in the website text.

Also, by keyword, it is meant to include, without limitation, letters, numbers, characters, symbols, syllables, emojis, subwords, plurals, and combinations of same. Indeed, the user may input and search on any combination of characters.

Exemplary labels include each of the SHAFT categories, cannabis, and 'none' (i.e., the website is non-SHAFT related).

Step 304 may be performed manually. An individual may search the extracted words for a SHAFT-related word (e.g., marijuana), check the website itself, and individually label the website according to the true category (e.g., cannabis).

In embodiments, a dictionary of the keywords for searching is stored. Examples of keywords include the category itself, as well as plurals and common misspellings.

In a preferred embodiment, and with reference to step 310, an untuned label model is applied to predict categories of the data to be labeled. The types of untuned label models may vary widely. Examples of untuned label models include, without limitation, decision tree-based models, Random Forest with or without gradient boosting, support vector machines (SVM), and logistic regression models. The untuned label model can be initially trained using the labeled data arising from step 304.

Although the untuned label model is not able to accurately predict categories for all the websites, the inventors have found its results can be useful for auto-labeling. In the case of thousands or tens of thousands of datapoints, auto labeling a portion of the datapoints is a real advantage.

In the embodiment shown in FIG. 4, and with reference to Step 312, the label model categorizes certain high confidence websites (e.g., where the probability is greater than 90% that the predicted category matches the true category). These high confidence websites can be auto-labeled based on this preliminary untuned label model.

Additionally, with reference to step 316, the untuned label model can show websites having low confidence scores (e.g., where the probability that the predicted category matches the true category is less than 50%). Low confidence scores arising from the marginal or edge datapoints are of high value for model training purposes. As described further herein, the edge datapoints are preferably manually labeled and the models are retrained using the additional edge datapoints. In embodiments of the invention, the datapoints are shown in order from the lowest to highest model confidence.

Additionally, in embodiments, with reference to step 314, categories are identified having small or low data counts. That is, categories are identified which ought to have more examples to ensure the prediction is accurate. In such instances, the datapoints are reviewed to identify any low count category. Additional keywords related to the low count category are searched in order to add more example datapoints to the low count category.

In embodiments, and with reference to step 320, a plurality of different-types of untuned label models are applied to predict categories of the data to be labeled. The different types of untuned label models can be the same as those described above in connection with step 310. Each of the untuned label models can be trained using the labeled data arising from step 304.

With reference to Step 322, when all the label models predict the same category for a website, a high confidence is assigned to this label for the website. These high confidence labels can be automatically applied to the associated websites based on these preliminary untuned label models.

Additionally, with reference to step 324, when all the label models disagree on predicting the same category for a website, we infer the datapoint has a low confidence score and is an edge type case. The marginal or edge datapoints arising from disputed classifications are of high value for model training purposes. As described further herein, the edge datapoints are preferably manually labeled and the models are retrained using the additional edge datapoints.

Step 330 states to evaluate sufficiency of the labeled data. This step can be performed by evaluating category counts to see which categories can be benefitted by more examples. For example, where a category count makes up less than 10% of the total datapoints (a relatively low count), the accuracy of the model may be suspect and not able to accurately classify new real websites properly because the labeled training data set is too small. When the training data set is too small, the model essentially evaluates itself on the limited data trained. For example, if the model is trained on a few websites that have the word "beer," and the model predicts with 100% accuracy such websites are classified as alcohol categories, the model may still be a poor performer. The model may mis-categorize, for example, a website that only lists tequila because tequila was not in the training data. Thus, step 330 serves to identify low data count categories to which more examples are added.

To add more examples to the low count category, the website text is further searched using additional keywords related to the low count category. For example, with reference to the "beer" store example described above, the text is searched for tequila, rum, and whisky to identify additional websites that ought to be categorized as alcohol. The additional examples are labeled. Then, the models are retrained per Step 340.

Additionally, where the models predict a category with low accuracy (e.g., less than 90% for some categories such as cannabis, or perhaps less than 70% for others such as firearms), such websites can be manually reviewed for their proper category. As described herein, low accuracy predictions or edge cases are of high model training value. After the proper category is identified for the edge case, it is relabeled per Step 340 and the model is retrained with the updated training sets.

In embodiments, the data labeling process is repeated or iterated for several cycles (or stages) until enough websites are confidently labeled based on the above auto-labeling criteria.

In embodiments, the evaluation and iteration are halted once the benefit in accuracy approaches a threshold despite further training of the model using additional examples, or high value datapoints.

Lastly, per step 350, the comprehensive labeled data set is saved. In embodiments, the data set is saved to a CSV file where each row comprises a name or id, website, the text, and label.

Figure 11:
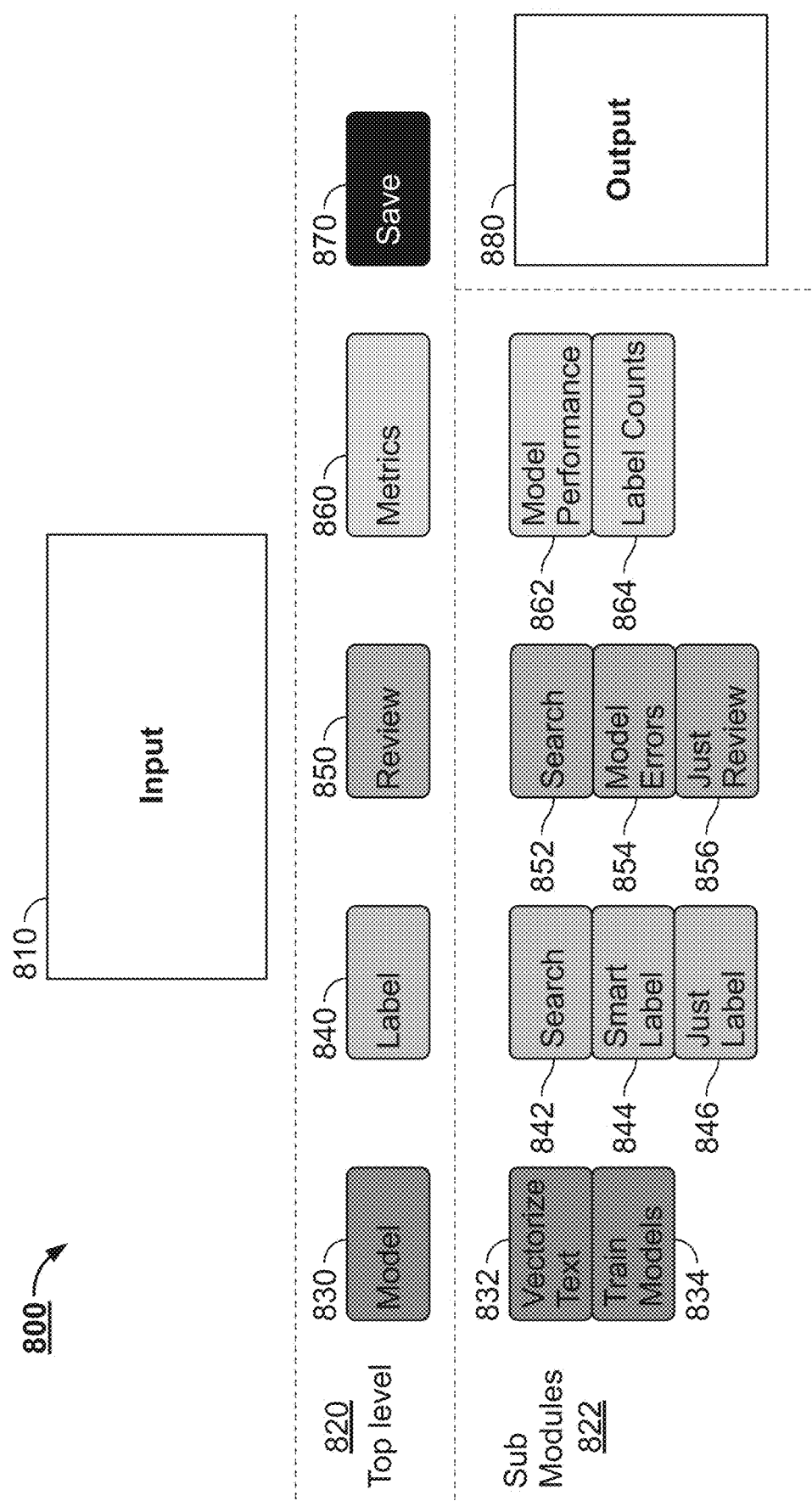
FIG. 11 is a schematic illustration of a data labeling tool, according to one or more embodiments of the present invention.
Figure 12:
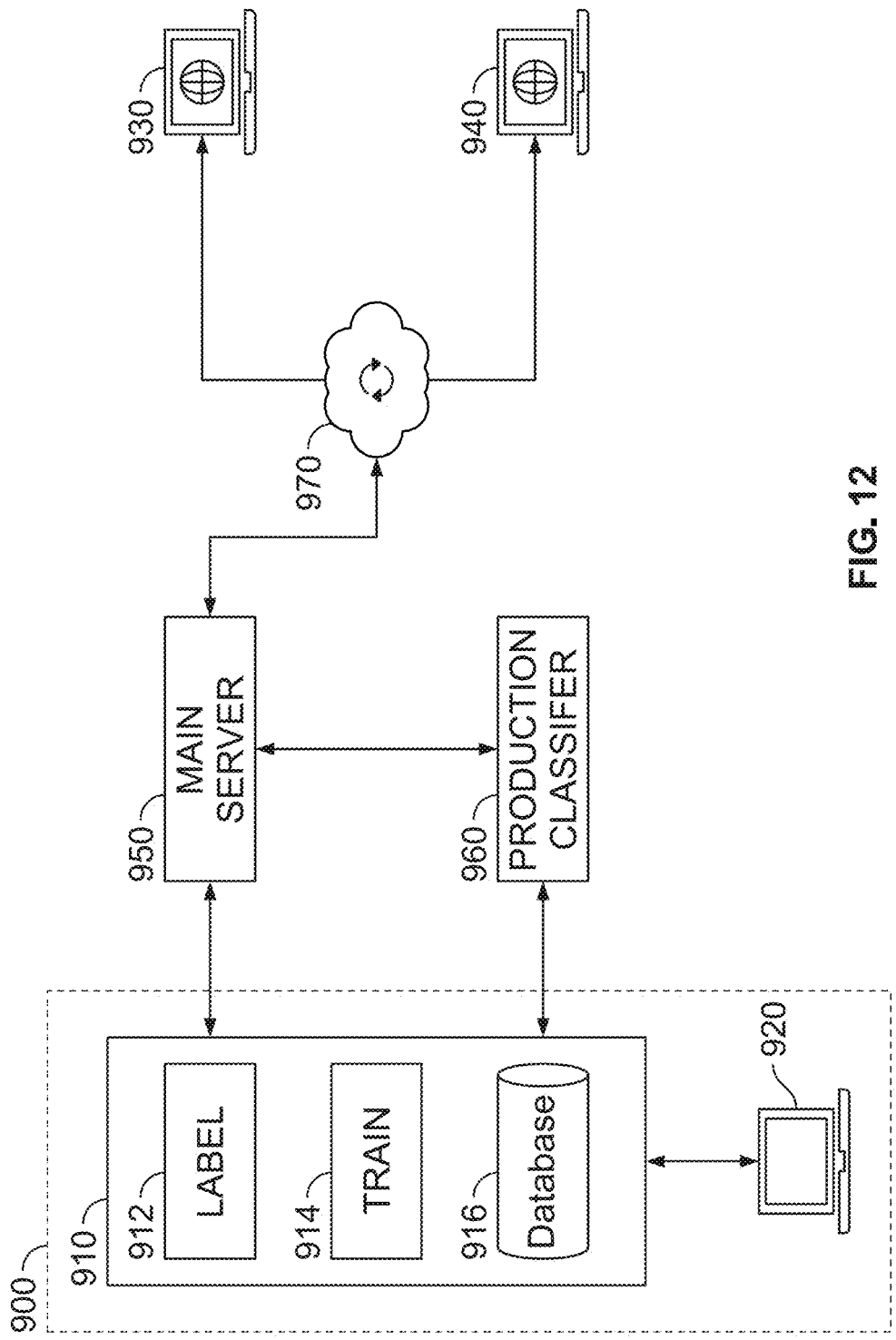
FIG. 12 is a schematic diagram of a data label-assist system, according to one or more embodiments of the present invention.
Figure 13:
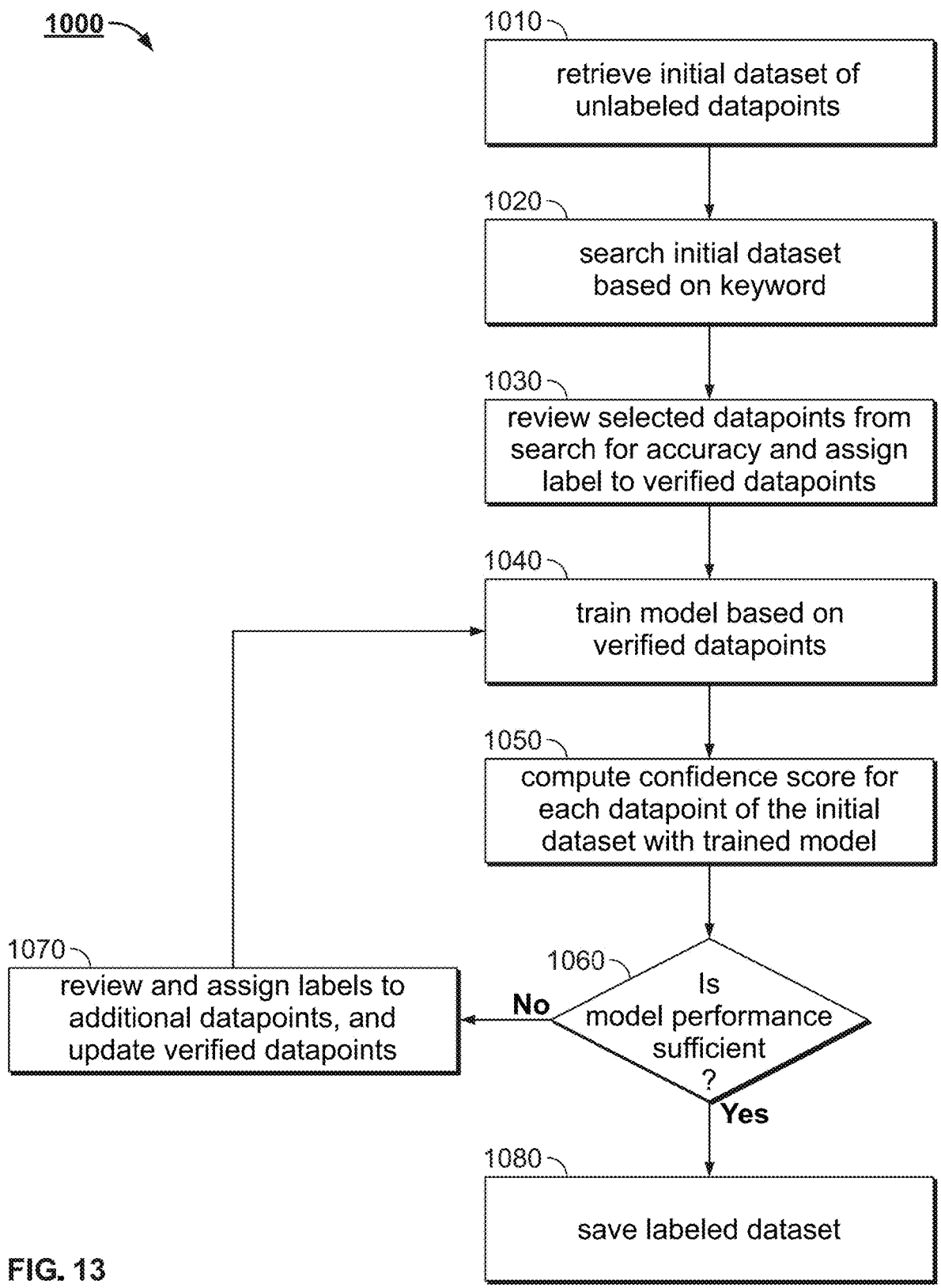
FIG. 13 is a flow chart of a computer-implemented method for assisting a user label a dataset, according to one or more embodiments of the present invention.

In embodiments of the invention, the data labeling step is performed by a user interface tool, for example a command line interface tool as described herein with reference to FIGS. 11-13. However, the invention is not intended to so limited except where recited in any appended claims.

Production Model Training

Figure 5:
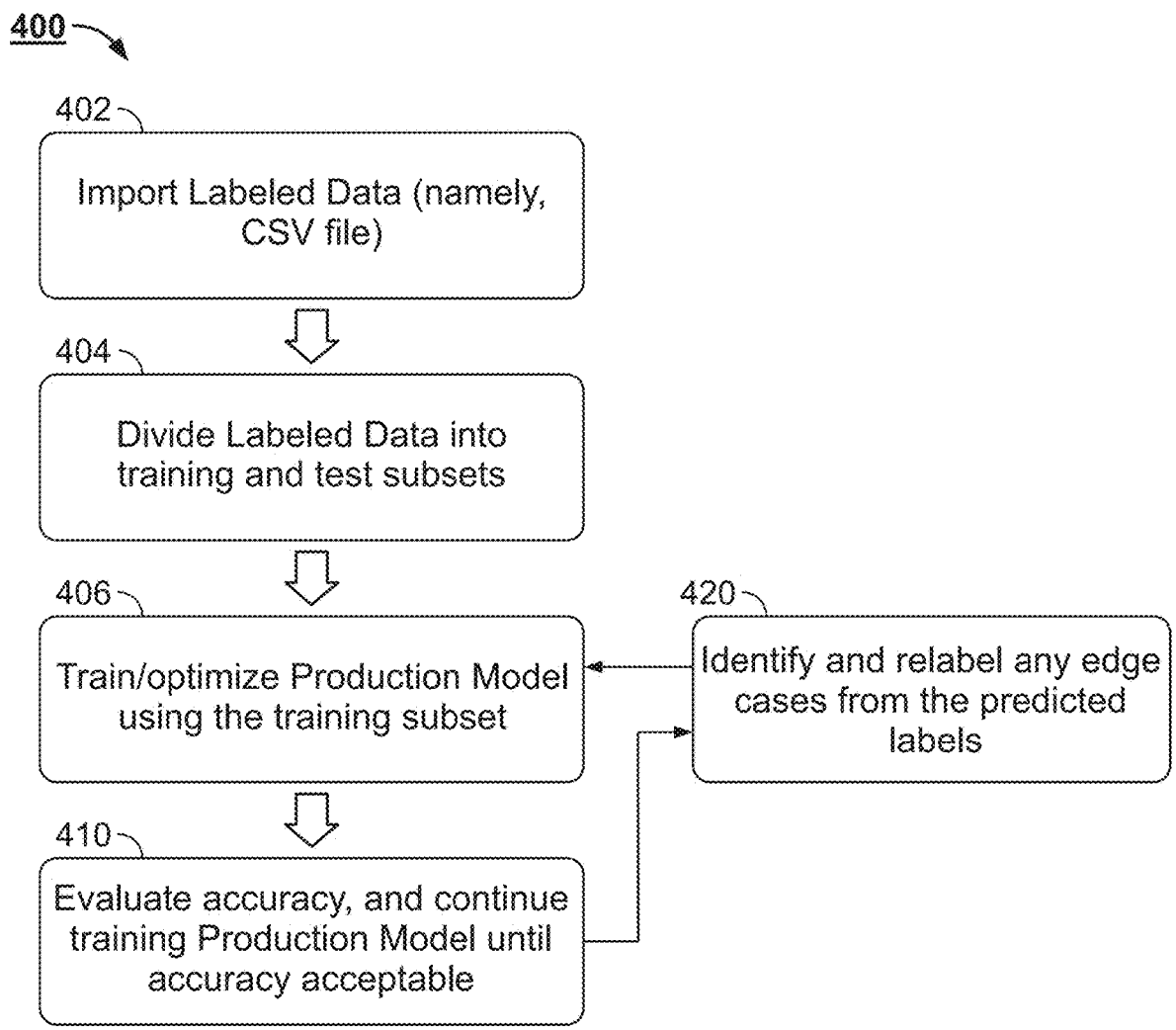
FIG. 5 is a flow chart of a model training process, according to one or more embodiments of the present invention.

With reference to FIG. 5, a process 400 for training a candidate production model is described in accordance with embodiments of the invention.

Step 402 states to import the labeled data. This step is performed by importing the comprehensive labeled data set described above in connection with the data labeling process 300. Typically, the labeled data is in the form of a CSV file, perhaps 5,000 or more rows of data including the entity name, website, extracted text, and label.

Step 404 states to divide the labeled data into a training and test set. For example, the data set may be divided into 5 groups (or 5 folds), 4 of which are used for training and one for testing.

Step 406 states to train the production model using the training data set. In embodiments, one production model is selected from the data labeling process 300, described above. In embodiments, the data labeling model having the highest accuracy for the greatest number of categories is selected as the production model for fine tuning and optimization. A preferred production model is the gradient boosting or extreme gradient boosting (XGBoost) ML model.

After a production model has been selected, it is tuned and optimized. Most models commence with a set of default tuning parameters. Examples of tuning parameters for the XGBoost ML model include, e.g., general parameters, booster parameters and task parameters.

In embodiments, general parameters include setting the type of booster to a tree-based model.

In embodiments, exemplary tree booster parameters include:
a. eta (alias: learning_rate)=0.3
b. gamma (alias: min_split_loss)=0
c. max_depth (maximum depth of a tree)=6
d. min_child_weight (minimum sum of weights of all observations required in a child)=1; max_delta_step=0
e. subsample (denotes the fraction of observations to be randomly samples for each tree)=1.
f. colsample_bytree, colsample_bylevel, colsample_bynode=1. This is a family of parameters for subsampling of columns.
g. lambda (alias: reg_lambda)=1.
h. alpha=0, alias: reg_alpha. This is the L1 regularization term on weights (analogous to Lasso regression).
i. tree_method tree_method string=auto. This is the tree construction algorithm used in XGBoost.
j. scale_pos_weight scale_pos_weight t=1. It controls the balance of positive and negative weights.
k. max_leaves max_leaves t=0. This is the maximum number of nodes to be added.

In embodiments, learning task parameter tuning includes setting the loss function to be minimized to regression with squared loss.

It is to be understood the above tuning parameters represent a set of exemplary tuning parameters of one embodiment of the invention and that the type of turning parameters used, and/or the values set for each tuning parameter may vary widely. Some parameters arise based on the type of model employed, and the values are set by default. Some tuning parameters are set and evolve as the model is trained. Indeed, the above is intended to illustrate exemplary parameters which can be applied in the XGBoost ML model.

Training and optimizing the model is continued for the labeled training data set and labeled test data set. Typically, training includes cross validation by switching the training and test sets and retraining through multiple stages.

Step 410 states to evaluate accuracy of the production model.

If the accuracy is acceptable, for example, if 95% or more of the predicted labels match the true labels, then the production model is saved.

However, and with reference to Step 420, if the desired accuracy or loss function is not sufficient, training is continued. As described herein, training may be improved by adding more labeled datapoints to the low count categories, relabeling predictions having low accuracy, and/or further tuning some of the model(s) parameters.

EXAMPLES

Figure 6:
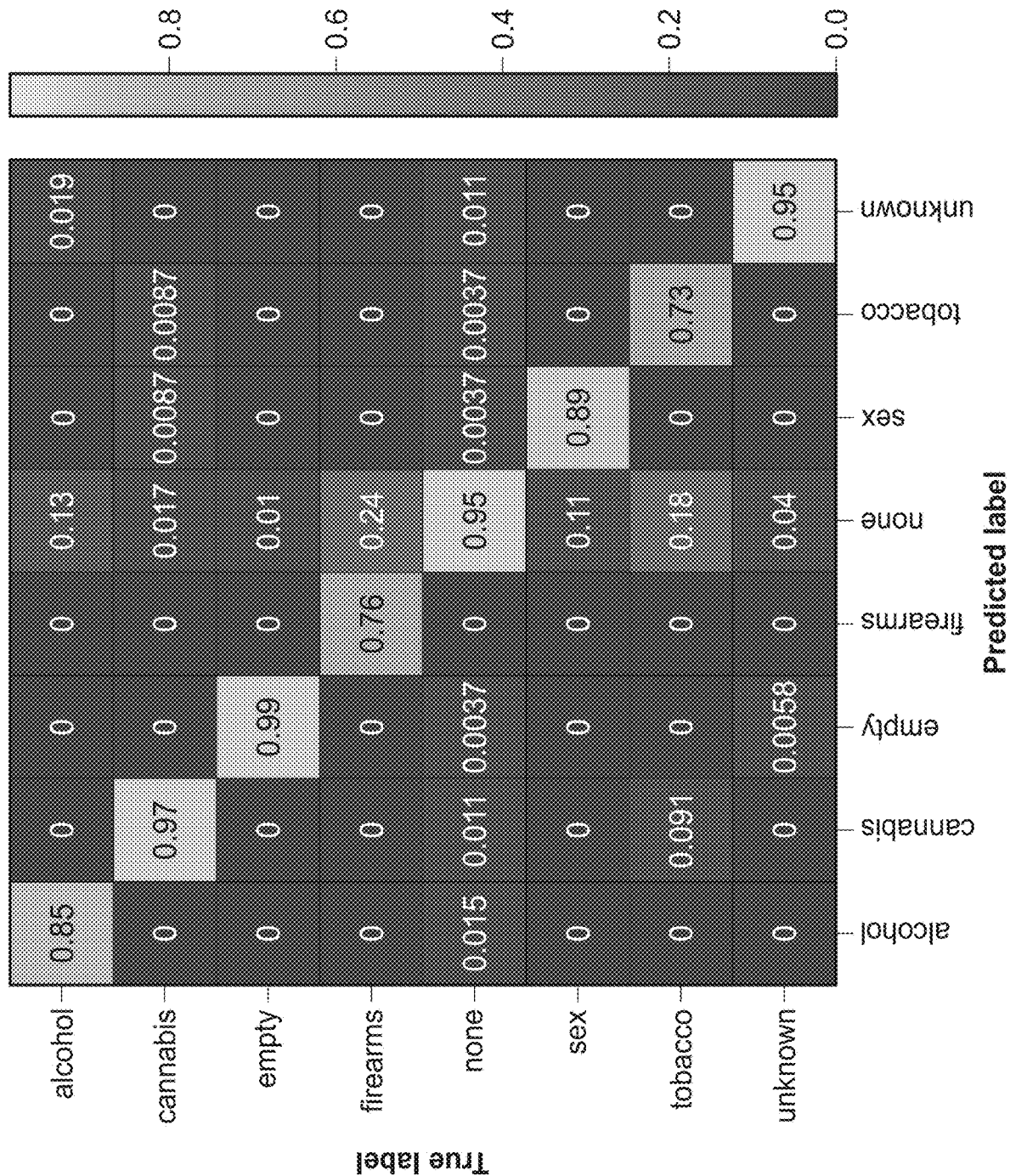
FIGS. 6-7 are charts illustrating results of a various models, according to one or more embodiments of the present invention.
Figure 7:
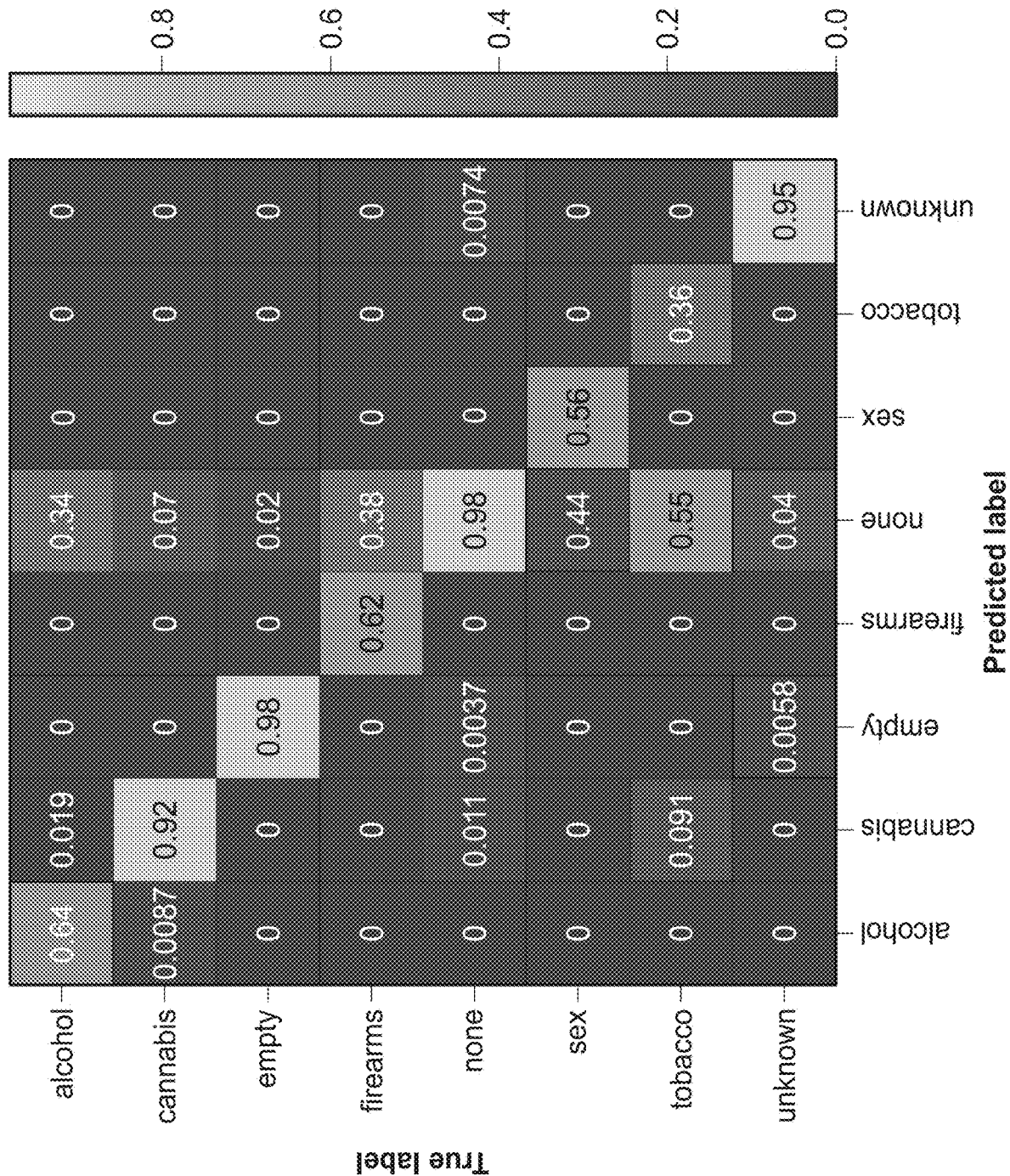

FIGS. 6-7 illustrate results of a XGBoost and Random Forest ML model, respectively. In each case, a labeled data set was prepared from 7500 websites. Each ML model was trained on 6000 websites and tested on 1500 websites. The text was extracted from the websites and parsed using a text extracting tool such as Beautiful Soup. The parsed text was vectorized using a vectorizer such as TF-IDF and then input to the model. The charts shown in FIGS. 6-7 reflect accuracy of the 1500 predicted labels versus the actual or true labels.

With reference to FIG. 6, the XGBoost ML Model, except for tobacco and firearms having the scores at 0.73 and 0.76 respectively, showed good results across all the categories (e.g., upwards of 85%). Tobacco had a lower score in part due to its very small sample (approximately 114 websites), as well as the challenging overlap between this category and the cannabis category. Tobacco had 10% of misclassifications in the cannabis category. Firearms also had a relatively low score and we acknowledge that the firearms category is a challenging category because of the inherent ambiguity in the guidelines for what constitutes firearms (such as holsters, accessories, gun safes, etc.) as well as the broad overlap in fishing/outdoor supplies stores which do/do not sell firearm related equipment.

With reference to FIG. 7, the Random Forest ML model also had several accurate categories. However, many categories were not accurate. Particularly, alcohol, sex, tobacco, and firearms are below 0.7, with tobacco only predicting the true label 0.36 of the times. Although the Random Forest ML model may suffice for certain categories, namely, cannabis, it is not preferred for many of the other SHAFT categories.

Without intending to be bound to theory, the lower accuracy arises at least in part due to unbalanced data-tobacco and sex companies collectively made up less than 0.5% of the population of the data set. Because of this disparity in the data, embodiments of the invention select types of ML models which perform well using unbalanced data (e.g., XGBoost, SVM).

Figure 8:
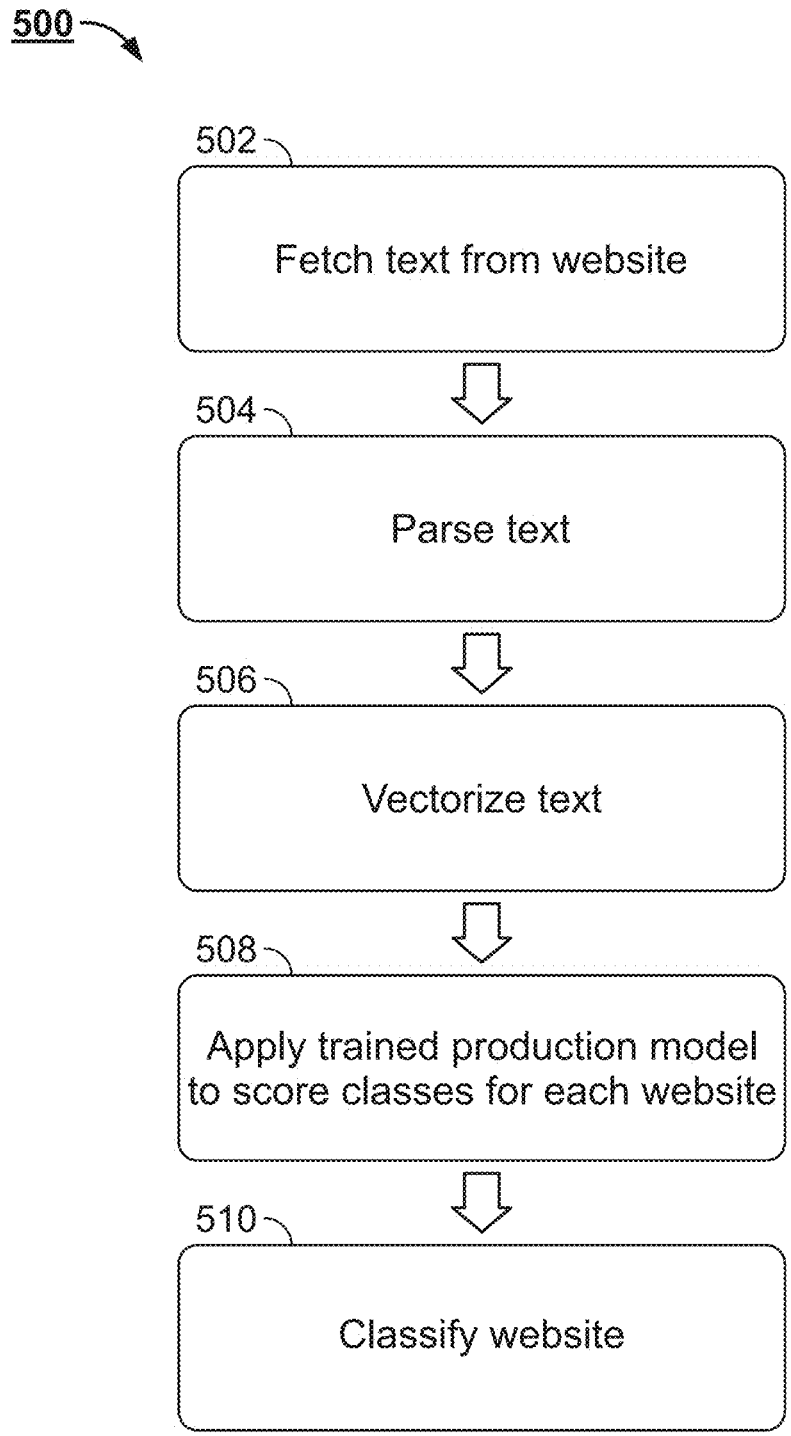
FIG. 8 is a flow chart of a classifying process, according to one or more embodiments of the present invention.

FIG. 8 is a flow chart of a classifying process to label unlabeled real websites, according to one or more embodiments of the present invention;

Step 502 states to fetch the website. Fetching may be performed by Python's request library using, e.g., a get request.

Step 504 states to parse the text. As described herein, the new website text is parsed using a parsing tool. A wide variety of parsing tools are available to carry out this step. In preferred embodiments, this step is carried out using Beautiful Soup.

Optionally, the text can be preprocessed. Preprocessing the text can include, without limitation, omitting/stopping certain words, stemming words, and/or changing the case of the letters (e.g., changing all uppercase letters to lowercase letters).

Step 506 states to vectorize the text. This step can be performed by the computing system using a vectorizer. While various vectorizers may be employed, in embodiments, the method uses the Term frequency-inverse document frequency (TF-IDF) model. The TF-IDF is a measure of importance of a word to a document in a collection or corpus, adjusted for the fact that some words appear more frequently in general.

The TF-IDF has several parameters which may be adjusted or set. In embodiments, adjusted TF-IDF parameters include the total feature/word count and the minimum and maximum document frequency that a word should have to be used as a feature.

In a preferred embodiment, the total feature/word count is limited to less than 5000, and more preferably less than 4000 words.

The minimum and maximum document frequency (min_df, max_df) limits the frequency that a word should have to be used as a feature. The frequency here refers to the proportion of documents. Both parameters have to be set in the range of [0,1] or 0 and 100%. If it is desired to remove more common words, the max_df is set to a lower ceiling value between 0 and 1. If it is desired to remove more rare words, the min_df is set to a higher cutoff value between 0 and 1.

In embodiments, the minimum document frequency that a word should have to be used as a feature (namely, the min_df) is set to range between [0.0003-0.001] or 3 out of 7500 websites.

In embodiments, maximum document frequency that a word should have to be used as a feature (namely, the max_df) is set to range between 25 to 75% and more preferably between 33 to 66% and in preferred embodiments between 40-50%, or between [0.40-0.50].

As indicated above in connection with the results illustrated in FIG. 6, these vectorizer parameters worked well when applied to the XGBoost ML model.

Step 508 states to apply the trained production model to score each of the classes for the website. In preferred embodiments, the score of each category represents a fraction of the whole where the sum of the scores is equal to 100%.

Step 510 states to classify the new website. In embodiments, the entire website is classified based on the computed scores from step 508. In a preferred embodiment, the website is classified according to the category receiving the highest score in step 508.

Figure 9:
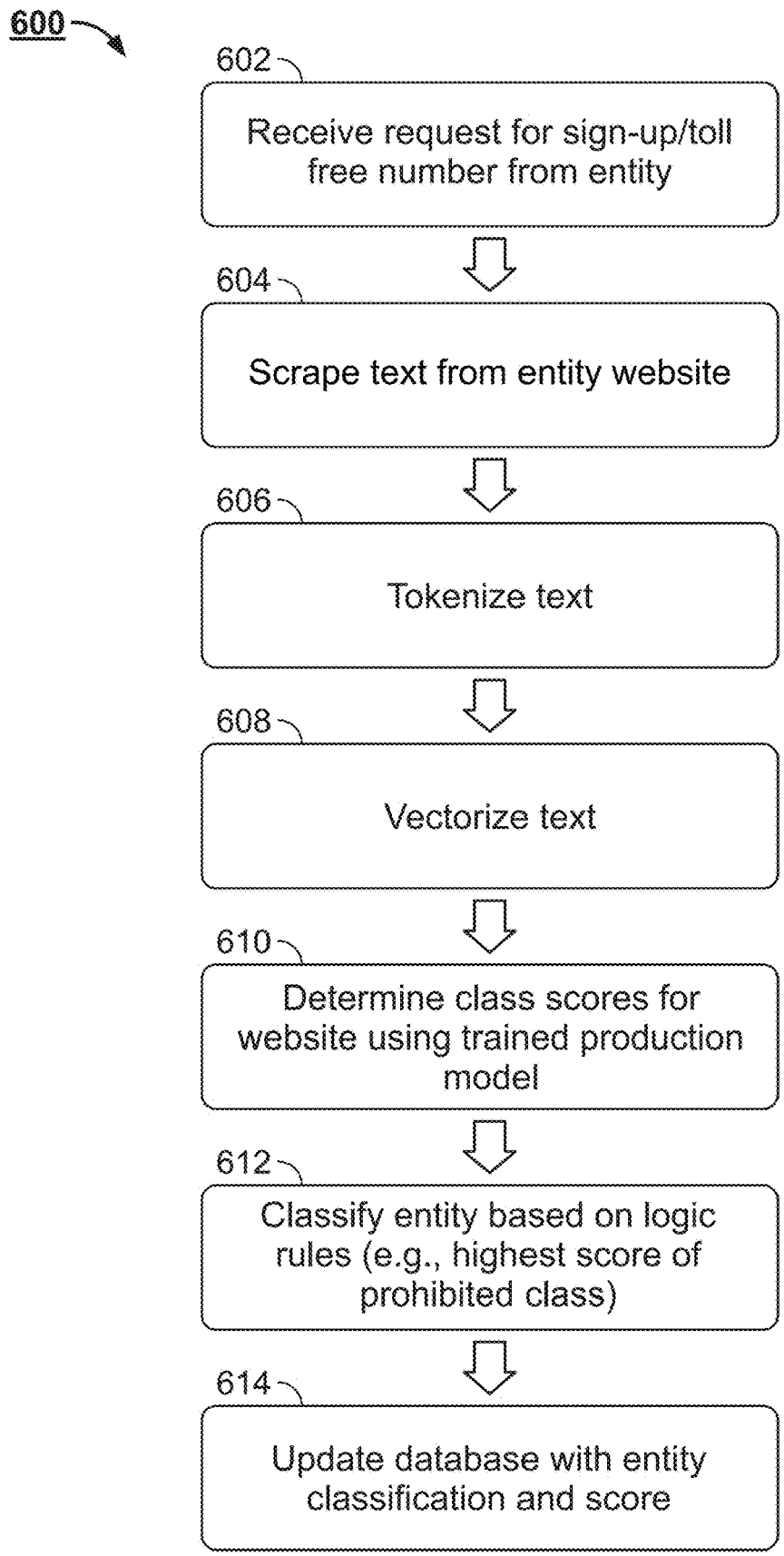
FIG. 9 is a flow chart of another classifying process, according to one or more embodiments of the present invention.

FIG. 9 is a flow chart of a classifying process 600 to label a new entity, according to one or more embodiments of the present invention.

Step 602 states receive request from a new entity to sign-up, or to use a toll-free number (TFN) or short message service (SMS). This step can be performed by the compliance check module 142 as described above in connection with FIG. 1. Once a request is received from the entity computing device 120, the compliance check module 142 commences the entity classification process 600.

Steps 604 states to scrape the website. This step can be performed as described above in connection with process 500.

Step 606 states to tokenize the text. This step can be performed using a tool that is operable to tokenize the text. Exemplary tools for tokenizing the text are described above in connection with process 500.

Step 608 states to vectorize the text. This step can be performed as described above in connection with process 500. In embodiments, the steps of tokenizing and vectorizing are performed by one tool, such as, for example, the TF-IDF tool.

Step 610 states to determine class scores for the new website using the trained production model. In embodiments, sex, hate, alcohol, firearms, tobacco, cannabis, none (i.e., non-SHAFT), empty (e.g., website not available), and unknown are scored. In preferred embodiments, the score of each category represents a fraction of the whole where the sum of the scores is equal to 100%.

Step 612 states to classify the entity based on the logic rules. In embodiments, the entity website is classified based on the computed scores from step 610. In a preferred embodiment, the entity website is classified according to the category receiving the highest score in step 610. The entity is then classified based on the classification of the website.

Optionally, in embodiments, the logic rules include additional factors such as, for example, (a) self-reporting data (e.g., the compliance check module can be programmed and operable to ask entity for its classification from a drop down listing), (b) publicly available information including state of incorporation, number of years in business, number of employees, existence and status of business licenses (e.g., pending alcohol license), and (c) text present in the entity name or website URL (e.g., cannabis.com). Scores may be adjusted based on the additional factors, increasing or decreasing (or overruling) the classification score. For example, if an entity is found to have a liquor or cannabis license, it can be labeled accordingly despite the initial classification score.

Step 614 states to update the database with the entity's classification and score from step 612. This information can be saved, e.g., on the SHAFT database 170 of main server computing system 140, described above in connection with FIG. 1.

In embodiments, the entire process 600 from receiving the request (step 602) to updating the database with the entity classification and score (step 614) can be implemented on commercially available hardware, examples of which are described herein, in under 30 seconds, and typically under 10 seconds. In some embodiments, speed is further improved by limiting the total length of inputted text (e.g., limit the inputted text to up to 2000 words). Another speed improving technique is to limit the vector length (e.g., reduce the vector length to 5000, more preferably to less than 4000, or in some embodiments to less than 2500). Additionally, in preferred embodiments, the steps are performed asynchronously and run in parallel. Thus, the server is not required to wait for one account request to be completed before starting to check another account request.

Figure 10:
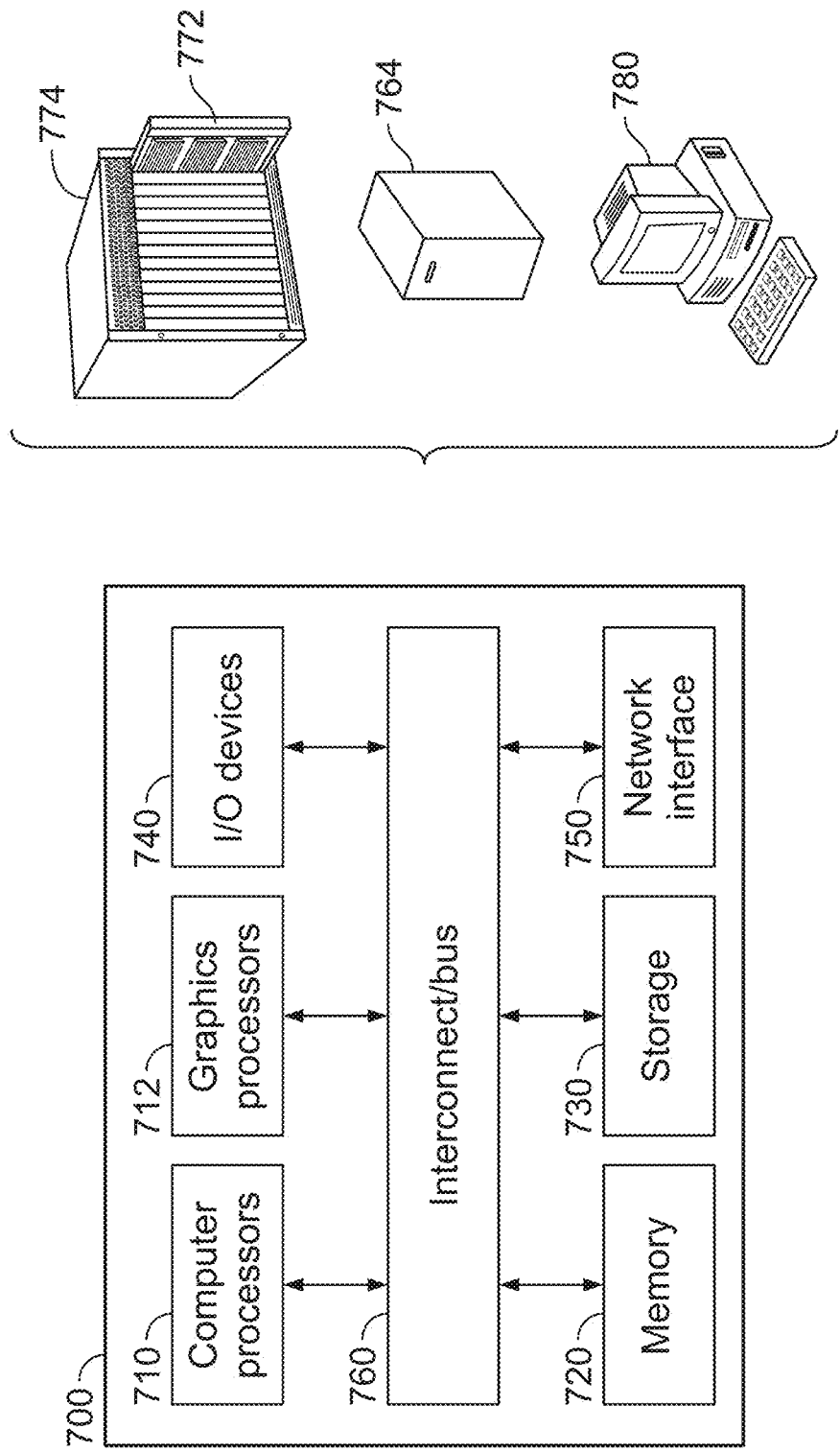
FIG. 10 is a block diagram of a computing system that can implement techniques described herein, according to one or more embodiments of the present invention.

FIG. 10 is a block diagram of a computing system 700 used to implement the techniques/processes described herein in accordance with embodiments of the invention. The computing device 700 is intended to represent various forms of digital computers, such as servers, workstations, desktops, laptops, and other appropriate computers. The components shown here, their connections and relationships, and their functions, are meant to be exemplary only, and are not meant to limit implementations of the inventions described and/or claimed herein.

The computing device 700 is shown including: a computer processor 710, graphic processor 712, memory 720, storage 730, input output devices 740 and network interface 750.

The processors 710, 712, memory 720, storage 730, and network interface 750 are interconnected using various interconnect busses 760, and may be mounted on a common motherboard or in other manners as appropriate. The processor(s) can process instructions for execution within the computing device 700 to carry out the operations described herein, and including instructions stored in the memory 720 to display command lines and/or graphical information for a GUI on a display unit coupled to the network interface, I/O ports, or dedicated video card (not shown).

The memory 720 stores information within the computing device 700. In some implementations, the memory 720 is a volatile memory unit or units. In some implementations, the memory 720 is a non-volatile memory unit or units. The memory 720 may also be another form of computer-readable medium, such as a magnetic or optical disk.

The storage device 730 can provide mass storage for the computing device 700. In some implementations, the storage device 730 may be or contain a computer-readable medium, such as a hard disk device, an optical disk device, a tape device, a flash memory or other similar solid state memory device, or an array of devices, including devices in a storage area network or other configurations.

A computer program product may also contain instructions that, when executed, perform one or more methods, such as those described herein. The computer program product can also be tangibly embodied in a computer- or machine-readable medium or media, such as the memory 720 or the storage device 730.

Examples of input/output devices 740 include without limitation, a keyboard, mouse or pointing device, and printer.

Network interface 750 can include various communication ports (e.g., USB, Bluetooth, Ethernet, wireless Ethernet, WIFI).

The computing device 700 may be implemented in a wide variety of different forms. For example, it may be implemented as a standard server 764 or a desktop computer 780.

In some embodiments, multiple processors and/or multiple buses are combined, as appropriate, along with multiple memories and types of memory. Multiple computing devices may be connected, with each device providing portions of the necessary operations (e.g., as a server bank, a group of blade servers, or a multi-processor system or framework). Examples of server systems for implementing the processes and methods described herein include, without limitation, cloud data centers with rack-mounted servers, blade server systems, etc.

In some embodiments, the classification method is implemented as a group of blade servers 772 housed in a blade server enclosure system 774. In some embodiments, a blade enclosure is operable to provide additional services such as power, cooling, networking, various interconnects and management.

Alternative Embodiments

In alternative embodiments, a classifier is trained to classify an entity with additional non-SHAFT categories including, for example, gambling, pharma, crypto, etc. In such embodiments, the model is trained as described herein except the training data is labeled with the non-SHAFT categories. The trained model is then used to classify the entity based on the entity's website as described herein with reference to the classifier models described above.

Data Labeling Tool

In embodiments, and with reference to FIGS. 11-12, a data labeling tool 800, 900 is operable to facilitate labeling datapoints of the data files used for training natural language classification models. Examples of data files include CSV files where each row comprises the datapoint ID (or other identifying information) and text to be searched and classified. For example, in embodiments, the text to be searched is extracted text from a website as described above in connection with FIGS. 3-4. However, in other embodiments, the data labeling tool is operable to label text for other classification or categorizing applications such as, for example, market segmentation based on buyer behaviors, spam based on SMS or email content, etc.

Various inputs are provided to the labeling tool. In the embodiment shown in FIG. 11, the tool input 810 includes a 'config' containing path to the csv data, labels, label dictionary, label prediction models, and names of the text/helper fields. Each of the inputs may be input by a user via a computing input device 920 such as a laptop, computer, workstation, etc. However, in embodiments, some of the inputs (e.g., the untuned simple natural language classification models) may be pre-existing and requested by the user via the input device. Also, in embodiments, the tool may include a pre-existing library of classification models.

Examples of text/helper fields can include, without limitation, relevant fields that help a user to label the row. For example, if the curator labeling "product reviews", helpful text/helper fields can include review Title and the Star Rating. However, the helper fields shall vary widely and depend on the context of the data and the desired labels.

FIGS. 11-12 also show top level modules 820 including: model 830, 914; label 840 912, review 850, metrics 860, and save 870. In embodiments, a computing device (e.g., 900 shown in FIG. 12) is programmed and operable to allow a user to open each of the top-level modules. In a preferred embodiment, the computing device can be programmed and operable to display on a laptop 920 a command line or graphical user interface. In the case of a GUI, in embodiments, the computing device can be programmed and operable to include a window with a tab for each module. The user may select the module to open. The user may then scroll through a drop-down menu of sub-modules and select one of the sub-module functionalities 822, described herein.

Label Module

In embodiments of the invention, the label module 840, 912 is programmed and operable to facilitate labeling datapoints of the data set.

Label module is shown including a search sub-module 842. Search sub-module is operable to search the text of each row based on keywords provided by the user (also referred to herein as curator) and to provide a listing of the datapoints in which the keyword was observed. The search sub-module 842 is further operable to allow the user to select one or more of the rows to label. For example, the user may search the entire set of datapoints for the keyword 'marijuana'. The module computes and provides within a threshold period of time all unlabeled observations that match the search criteria. An exemplary threshold period of time for computations ranges from 0 to 10 seconds, preferably less than 1 second, and in some implementations less than 0.1 seconds. In faster implementations, the applicable module is programmed and operable to display the unlabeled datapoints as they are determined as opposed to after the entire dataset is computed. In such implementations, computation times can be less than 0.1 seconds.

Then, each of the unlabeled datapoints may be manually verified by the user.

In embodiments, the module automatically queries the user for whether to identify and assign one or more of the unlabeled results with a label (e.g., 'cannabis'). In a sense, the search sub-module provides a one-click operation to label multiple datapoints.

In embodiments, and depending on the number of datapoints available, 25 or more datapoints are labeled for each category. More preferably. 100 or 200 or more datapoints are initially labeled for each category using the search module.

In embodiments, the system 800/900 builds a dictionary of the keywords from the user, and then stores the keywords in a keyword dictionary. Examples of keywords include the category itself, as well as plurals and common misspellings of the category name.

In a preferred embodiment, and with reference to sub-module 846, an untuned label model is applied to predict categories of the data to be labeled. The types of untuned label models may vary widely. Examples of untuned label models include, without limitation, decision tree-based models, Random Forest with or without gradient boosting, support vector machines (SVM), and logistic regression models. The untuned label model can be initially trained using the labeled data arising from the search sub-module 842, described above.

Although the untuned label model is not able to accurately predict categories for all the datapoints, the inventors have found its results can be valuable for auto-labeling. In the case of thousands or tens of thousands of datapoints, auto-labeling a portion of the datapoints is a great advantage.

In some embodiments, the 'just label' sub-module 846 is operable to categorize certain high confidence datapoints (e.g., where the probability is greater than 90% that the predicted category matches the true category) based on the untuned model. These high confidence datapoints can be reviewed and labeled by the user, or in some embodiments, auto-labeled.

Additionally, with reference to 'smart label' sub-module 844, the untuned label model identifies datapoints having low confidence scores (e.g., where the probability that the predicted category matches the true category is less than 50%). Low confidence scores arising from the marginal or edge datapoints are of high value for model training purposes. As described further herein, the edge datapoints are reviewed and manually labeled and the model(s) are retrained using the additional edge datapoints. In embodiments of the invention, the datapoints are shown in order from the lowest to highest model confidence.

Review Module

In embodiments of the invention, a label model tool 800 includes a top-level review module 850 to identify errors and keep track of which datapoints have been reviewed.

Sub-module search 852 operates the same as described above with respect to search 842. Upon instructions from the user, a search term is input to identify a datapoint for review. Examples of search terms include, without limitation, keywords such as 'marijuana' for the label cannabis and 'beer' for the label alcohol, etc.

Sub-module model errors 854 automatically identifies mislabeled datapoints in which the model has predicted a label different from the actual label. The mislabeled datapoints can be updated manually and saved.

Sub-module 'just review' 856 is operable to facilitate reviewing the data set, and validate the records that were just assigned. A datapoint or row of data is presented to the user one at a time. In embodiments, the sub-module 856 allows the user to add columns to the datapoints such as a 'reviewed' column for indicating whether a datapoint has been reviewed previously.

Metrics Module

In embodiments of the invention, the label-assist model tool 800 includes a top-level metrics module 860 to compute various metrics for the dataset.

In embodiments, with reference to sub-module 862, one or more metrics for model performance are computed and displayed. Examples of metrics include, without limitation, total datapoints, labeled datapoints, unlabeled datapoints, counts for each label, model errors, accuracy tables, and confidence levels.

In embodiments, and with reference to sub-module 862, accuracy is computed and displayed. Where the model(s) predict a category with low accuracy (e.g., less than 90% for some categories such as cannabis, or perhaps less than 70% for others such as firearms), the datapoints associated with these inaccurate categories can be manually reviewed for their proper category using the search function 842/852 discussed herein. The inventors also recognize that low accuracy predictions or edge cases are of high training value. After the proper category is identified for the offending datapoint, it is relabeled per label model 840/912 and the language classification model is retrained with the updated data training set as discussed herein. In a preferred embodiment, the datapoints are displayed with a confidence score in order from lowest confidence score to highest confidence score.

In embodiments, with reference to sub-module 864, label counts are computed and displayed. Label counts can be important in understanding which categories can be benefitted by adding more labeled datapoints. For example, where a category count makes up less than 10% of the total datapoints (a relatively low count), the accuracy of the model may be suspect and not able to accurately classify new real datapoints properly because the labeled training data set is too small for the low count category. When the training data set is too small, the model essentially evaluates itself on the limited data trained. For example, if the model is trained on a few websites that have the word "beer," and the model predicts with 100% accuracy such websites are classified as alcohol categories, the model may still be a poor performer. The model may mis-categorize, for example, a website that only lists tequila because tequila was not in the training data. Thus, presenting label counts can serve to identify low data count categories to which more examples are added. In embodiments, the user re-searches for candidate datapoints in the low count categories. The user can use the label module 840/912 to find more examples of the low-count category and manually label them properly until a sufficient number of labeled datapoints have been added to the low count category. Then, the model is retrained, as discussed herein.

Model Module

In embodiments of the invention, the model tool 800 includes a top-level model module 830/914 for assisting a user to train one or more untuned natural language classification models. Examples of untuned label models include, without limitation, decision tree-based models, Random Forest with or without gradient boosting, support vector machines (SVM), and logistic regression models.

Sub-module vectorize text 832 allows the user to request the text of the datapoints (labeled and unlabeled) to be vectorized for training the model.

Sub-module train models 834 allows the user to train one or more models using the vectorized text from sub-module 832. After the model is trained, and run on the dataset, the user may label manually or automatically additional datapoints via the label module 840 and its sub-modules 842, 844, and 846. Preferably, high value 'edge-type' datapoints and model errors are identified, reviewed and labeled. Preferably, more examples are added to any low count categories. The classification model can then be retrained on the improved dataset. This process of updating the dataset, retraining the model, computing predictions values, and assigning labels to additional datapoints is repeated until the prediction accuracy is satisfactory and the counts for each category are sufficient.

In embodiments, the process is repeated for additional untuned models. Some models may work better than others on certain categories and data. The inventors have found that repeating the process with different models serves to identify high value datapoints in the data set to be manually reviewed. For example, where multiple models disagree on a datapoint, such a datapoint tends to have high value to review and manually label for retraining purposes.

In embodiments, the data labeling process is repeated or iterated for several cycles (or phases) until enough datapoints are confidently labeled based on the above labeling criteria.

In embodiments, the evaluation and iteration are halted once the benefit in accuracy approaches a threshold despite further training of the model(s) using additional examples, or high value datapoints.

Label-assist tool 800/900 is also shown having a save function operable to save the comprehensive labeled data set to a database (e.g. 916 of FIG. 12). In embodiments, the updated data set is saved to a CSV file where each row further comprises the label and optionally a confidence score if computed. The file may also include a review column for indicating whether or not the datapoint had been reviewed or verified. In embodiments, the labeling tool 800/900 is programmed and operable to output 880 or export labels for each of the datapoints including the predictions to a database or another device.

In embodiments, and with reference to FIG. 12, the updated saved data set or output is used to train a machine learning production level model 960 for classifying text obtained from remote sources. Remote sources include without limitation entity websites hosted on cloud-based servers 970 which are operable to receive input from entities (e.g., a business selling goods or services via the website) and sub-entities (e.g., a purchaser of the goods and services) via computing or input devices 930 and 940 respectively. The cloud-based server may be programmed and operable to transfer information with a main server 950. Main server 950 is programmed and operable to sync the data with label-assist tool 900. As described herein, data label-assist tool 900 is operable to prepare a comprehensive data set for training a production model classifier. The production classifier is output to production classifier module 960.

In an implementation of the invention, in real time or near real time, entity and sub-entity information is detected or sensed and sent to main server for processing. The main server sends the information to production classifier for classifying the entity or sub-entity (e.g., classifying an entity based on its website, classifying a message based on its content, or classifying a sub-entity based on its detected purchasing behavior).

FIG. 13 is a flowchart of a CLI labeling tool 1000 to assist a user label a dataset in accordance with embodiments of the invention.

Step 1010 states to retrieve initial dataset of unlabeled datapoints. In embodiments, this step may be carried out by the user entering a command line on an input computing device (e.g., a keyboard or laptop 920 shown in FIG. 12). The labeling tool (e.g., the label module 912 shown in FIG. 12) is programmed and operable to retrieve the initial dataset of unlabeled data upon the user request. An example of a user request is 'retrieve' commands for a specified file location or path.

Step 1020 states to search initial dataset based on keyword. This step may be carried out by the user entering a command line on an input computing device (e.g., the laptop 920 shown in FIG. 12). The labeling tool (e.g., the label module 912 shown in FIG. 12) is programmed and operable to search a column of each row of the initial dataset for a keyword when the user inputs the command.

Step 1030 states to review selected datapoints from the search for accuracy and assign a label to verified datapoints. This step may be carried out by the user (or curator) entering a command line on an input computing device (e.g., the laptop 920 shown in FIG. 12). The labeling tool (tool 900 shown in FIG. 12) is programmed and operable to present the content of each row (optionally one at a time) of the initial dataset in which the keyword was observed. The user or curator reviews the contents of the row and manually assigns a label to the datapoint. In embodiments, an extra column may be added to the row for the label and optionally predicted score and review status, discussed herein.

Step 1040 states to retrain models based on verified datapoints. This step may be carried out by the user entering a command line on an input computing device (e.g., the laptop 920 shown in FIG. 12). The labeling tool (e.g., the train module 914 shown in FIG. 12) is programmed and operable to train or retrain as the case may be a natural language classification model based on the verified labeled datapoints generated from step 1030.

Step 1050 states to compute confidence scores for each datapoint of the initial dataset with the trained model. This step may be carried out by the user entering a command line on an input computing device (e.g., the laptop 920 shown in FIG. 12). The labeling tool (e.g., the label module 840, 912 shown in FIGS. 11, 12 respectively) is programmed and operable to automatically execute the classification model to determine confidence scores for all datapoints of the dataset.

Step 1060 states to query whether classification model performance is sufficient. This step may be carried out by the user entering a command line (e.g., review 850, or Metrics 860 shown in FIG. 11) on an input computing device (e.g., the laptop 920 shown in FIG. 12). The labeling tool (e.g., 900 shown in FIG. 12) is programmed and operable to present the various metrics, performance or accuracy, label counts, model errors, and confidence scores (optionally, in chronological order) for the user to evaluate whether the model is sufficient. In some embodiments, the labeling tool is programmed to automatically determine whether classification is sufficient based on a metric. In embodiments, the labeling tool evaluates whether the accuracy is greater than a threshold value, and if so, the classification model is saved as sufficient or complete according to step 1080.

Step 1070 states to review and assign labels to additional datapoints, and update verified datapoints. This step may be performed in the event the classification model performance is determined per step 1060 to be insufficient. This step may be carried out by the user entering a command line (e.g., label 840 shown in FIG. 11) on an input computing device (e.g., the laptop 920 shown in FIG. 12). The labeling tool (e.g., 800 shown in FIG. 11) is programmed and operable to execute label sub-modules 844, 846 to allow the user to efficiently label additional high training-value datapoints. In the event a category is observed to have a low count, the user executes the search function/sub-module to identify additional datapoints to add to the low count category. Any model errors may also be reviewed and labeled properly during this step. Indeed, step 1070 streamlines adding high value training datapoints for reinforced learning of the classification model.

After a sufficient number of datapoints have been labeled in step 1070, the process returns to step 1040 to retrain the classification model. The steps of assigning more labels, training the classification model, computing confidence scores, and evaluating model performance are repeated until model performance is sufficient. In embodiments, model performance is determined sufficient based on accuracy (i.e., between the predicted labels from the model to user verified labels of a validation dataset). In some embodiments, the user is prompted for an accuracy target. The accuracy can be an input (e.g., 810 of FIG. 11). In some embodiments, the data label tool includes a default accuracy of 90 or 95%, which the user can accept or adjust.

However, in other embodiments, the data label tool may be operable as long as the user desires or until a predetermined amount of time has passed. For example, an urgent request may require the user to label as many datapoints as possible within a two (2) hour window. The user applies the tool described herein (repeating the steps of assigning more labels, training the classification model, computing confidence scores, and evaluating model performance) regardless of the accuracy of the labels for the entire time allotted.

Step 1080 states to save the labeled dataset. This step may be carried out by the user entering a command line (e.g., save 870 shown in FIG. 11) on an input computing device (e.g., the laptop 920 shown in FIG. 12). The labeling tool (e.g., 900 shown in FIG. 12) is programmed and operable to save the data in database 916. Optionally, the data labeling tool 900 may be programmed and operable to export the dataset based on a user command line input to the computing device.

As described herein, the updated comprehensive labeled dataset can be used to train a production text classifier such as production classifier 960. In preferred embodiments, a main server is operable with the production text classifier to assign labels or predicted labels in real time to new datapoints received from remote servers. Examples of datapoints to be labeled include without limitation, on-boarded entity websites, detected sub-entity or purchaser behaviors, and electronic message content.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in another order than that specifically described above. Additionally, any of the components and steps described herein may be combined with one another in any logical manner except where such components or steps would be exclusive to one another. Accordingly, the scope and spirit of the invention should be judged in terms of the claims, which follow as well as the legal equivalents thereof.

What is claimed is:

1. A computer-implemented method for assisting a user with labeling an initial dataset of unlabeled datapoints, the method comprising the steps of:
   upon a first computer command, retrieving the initial dataset;
   upon a second computer command, filtering the plurality of unlabeled datapoints of the initial dataset to a first set of unlabeled datapoints based on a first keyword associated with a first label;
   assigning the first label to at least a portion of the unlabeled datapoints of the first set of unlabeled datapoints after verifying the first label is correct for the unlabeled datapoint being reviewed, thereby generating a first set of verified labeled datapoints;
   prompting the user to select a first data-labeling model from a library of pre-existing data-labeling models;
   upon a third computer command, selecting the first data-labeling model;
   upon a fourth computer command, training, during a first phase, the first data-labeling model based on the first set of verified labeled datapoints; and
   upon a fifth computer command, computing a confidence score for each of the datapoints of the initial data set based on the first data-labeling model.

2. The method of claim 1, further comprising, automatically assigning the first label to all unlabeled datapoints with a confidence score greater than a threshold value, thereby defining a first set of predicted labeled datapoints.

3. The method of claim 2, further comprising training, during a second phase, the first data-labeling model based on the first set of verified labeled datapoints and predicted labeled datapoints.

4. The method of claim 3, further comprising, subsequent to the training, computing a confidence score for each of the datapoints of the initial data set.

5. The method of claim 4, further comprising automatically assigning the first label to all the datapoints with a confidence score greater than the threshold value, thereby updating the predicted labeled datapoints.

6. The method of claim 5, further comprising sequentially repeating the training, computing, and assigning steps until label accuracy between the predicted labeled datapoints and a validation data set is above a target value.

7. The method of claim 6, further comprising identifying a first edge set of datapoints having confidence scores below a minimum value.

8. The method of claim 7, further comprising assigning the first label to at least a portion of the first edge set of datapoints after verifying the first label is correct for the datapoint being reviewed, thereby generating a second set of verified labeled datapoints.

9. The method of claim 8, further comprising retraining the first data-labeling model based on all labeled datapoints including all verified labeled datapoints.

10. The method of claim 9, further comprising, via a GUI, automatically showing suspect datapoints where the label predicted by the retrained first data-labeling model is in conflict with the verified label, and prompting the user to review and optionally relabel the suspect datapoints.

11. The method of claim 2, further comprising, upon a sixth computer command, computing a plurality of metrics, wherein at least one of the metrics is a count of labeled datapoints for each label category.

12. The method of claim 11, further comprising generating additional verified labeled datapoints if the count of the labeled datapoints is below a minimum count.

13. A command user interface tool to assist labeling an initial dataset of unlabeled datapoints with a plurality of different categories comprises:
- a user input device for receiving user commands;
- a display; and
- a processor framework programmed and operable to:
  - upon receiving a user search command, generate a filtered set of unlabeled datapoints by searching and filtering the initial data set of unlabeled datapoints based on a keyword associated with each category;
  - generate a verified set of labeled datapoints based on a user manually reviewing and labeling the filtered set of unlabeled datapoints;
  - prompt the user to select a first data-labeling model;
  - upon receiving a user train command, train, during a first phase, the first data-labeling model based on the verified set of labeled datapoints;
  - upon receiving a user compute command, compute a category and confidence score for each datapoint of the initial dataset based on the first data-labeling model;
  - prompt the user to select a second data-labeling model different than the first data-labeling model, and train the second labeling model, based on the verified set of labeled datapoints;
  - compute a category and confidence score for each datapoint of the initial dataset based on the second data-labeling model;
  - compare, for each datapoint, the category and confidence score of the first data-labeling model and second data-labeling model; and
  - show datapoints in which the category computed by the first data-labeling model disagrees with the category computed by the second data-labeling model.

* * * * *